United States Patent [19]

Pekarsky et al.

[11] Patent Number: 5,725,221
[45] Date of Patent: Mar. 10, 1998

[54] TWO PIECE SEAL

[75] Inventors: Lev Pekarsky, W. Bloomfield; Charles Gregory Hartinger, Farmington Hills, both of Mich.

[73] Assignee: Ford Global Technologies, Inc., Dearborn, Mich.

[21] Appl. No.: 695,251

[22] Filed: Aug. 8, 1996

Related U.S. Application Data

[63] Continuation of Ser. No. 364,360, Dec. 27, 1994, abandoned.

[51] Int. Cl.$^6$ .................................................. F16J 9/00
[52] U.S. Cl. .......................... 277/29; 277/70; 277/136; 277/165
[58] Field of Search .................... 277/29, 136, 165, 277/215, 70, 71, 72 FM, 76, 77, 173, 177, 160

[56] References Cited

U.S. PATENT DOCUMENTS

| | | | |
|---|---|---|---|
| 2,420,040 | 5/1947 | Frisby et al. | 277/70 |
| 2,562,675 | 7/1951 | Mayfield | 277/160 |
| 2,577,497 | 6/1951 | Carney | 277/160 |
| 3,149,848 | 9/1964 | Galloway | 277/165 |
| 3,341,209 | 9/1967 | Prasse et al. | 277/160 |
| 3,663,024 | 5/1972 | Traub | 277/165 |
| 4,094,516 | 6/1978 | Morley et al. | 277/165 |
| 4,123,068 | 10/1978 | Van Gorder | 277/29 |
| 4,199,152 | 4/1980 | Catterfeld | 277/3 |
| 4,497,494 | 2/1985 | Allen et al. | 277/165 |
| 4,573,496 | 3/1986 | Richard | 277/177 |
| 4,681,327 | 7/1987 | d'Agostino et al. | 277/29 |
| 4,890,849 | 1/1990 | Eason | 277/27 |
| 5,018,753 | 5/1991 | Porel | 277/165 |
| 5,071,142 | 12/1991 | Rehfeld | 277/165 |
| 5,143,382 | 9/1992 | Maringer | 277/165 |
| 5,374,168 | 12/1994 | Kozawa et al. | 277/165 |
| 5,467,689 | 11/1995 | Carlin et al. | 277/70 |

*Primary Examiner*—Daniel G. DePumpo
*Attorney, Agent, or Firm*—James J. Dottavio

[57] ABSTRACT

A dynamic two-piece seal comprising a first member unaffected by the pressurization of the seal. A second member of the seal has projections which prevent relative motion between the first and second seal members.

10 Claims, 1 Drawing Sheet

TWO PIECE SEAL

This is a continuation of application Ser. No. 08/364,360 filed Dec. 27, 1994, now abandoned.

BACKGROUND OF THE INVENTION

1. Field of the Invention

The present invention relates to the field of dynamic hydraulic seals, particularly seals using a two-piece construction.

2. Description of the Prior Art

Many different techniques have been used to produce a dynamic hydraulic seal where reciprocating or rotary motion occurs between parts being sealed. O-ring and lip-type seals have been employed is such situations, but these seals are limited in the amount of pressure which can be handled without extruding the seal, plus the interface between these seals and moving members may create a relatively high frictional drag, and the material of such a seal in these applications is prone to high wear due to the relative motion of the moving member to the seal.

Scarf-cut seals are also employed in similar applications. Scarf-cut seals are relatively inexpensive, may handle higher pressures, and wear less than O-ring or lip-type seals, as they are typically made of a hard anti-frictional material, such as glass-filled PTFE. Scarf-cut seals are installed within a groove of a rotating member, such as a shaft, mounted adjacent a second relatively rotating member, such as a housing. When the scarf-cut seal is pressurized, the fluid forces the seal axially into sealing contact against one wall of the groove and exerts a radial force on the seal to intensify the sealing contact between the seal and housing. A problem with a scarf cut seal is that the seal rubs against both rotating members, and the rubbing causes wear of rotating members composed of soft materials, such as an aluminum shaft, because the soft rotating member rotates relative to the seal.

U.S. Pat. No. 5,018,753 ('753) discloses a seal which uses a two-piece seal design. One seal is made from a flexible material 1 and a second seal is made from a hard material 2. Both the flexible and hard seals act to seal between the shaft and housing. The seals are installed in a gorge 3 machined into a shaft 4, which is enclosed by a housing 5. The flexible seal seals between itself and the hard seal, plus between itself and the gorge. The hard seal seals axially between itself and the shaft, plus radially between itself and the housing. The flexible seal is flattened when the seal is pressurized, and is thus displaced axially relative to the hard seal. The flattening of the flexible seal causes the flexible seal to expand radially against the hard seal to increase the sealing contact between the two seal members while thrusting the hard seal further into sealing contact against the housing 5, plus creates an axial seal between the flexible seal and the gorge. The flexible member includes ribs 7, which extend parallel to the axis of the shaft partially across its width, and the hard seal has corresponding grooves across a portion of its width to assist in preventing relative motion between the two seal members. The grooves of the seal in the '753 patent do not discharge into the gorge, as '753 states this would cause a separation of the seal members. The '753 patent thus provides a flat on each of the seal members to create a seal between the seal members, thereby to ensure the fluid does not pass either of the seal members.

Problems with the '753 patent include difficulty in manufacture of the components and assembly of the parts, plus the required relative lateral motion of the seal members during pressurization. In the '753 patent, partial ribs and grooves complicate the manufacturing processes of the components by requiring more complicated tooling to create these features, or requiring secondary operations on the parts, each of which increases cost. Additionally, the thickness of the seal is relatively uniform around its perimeter, thus requiring a large, uniform pressure to compress the seal around its perimeter during installation, which makes assembly more difficult. Finally, both the flexible and hard seal members are forced against the side of the gorge to facilitate sealing. As the seal is pressurized, this requires both members to translate, which causes wear of the flexible seal, plus increases the response for the seal to activate.

It would be desirable to have a seal that prevents the wear of moving components and is easy and inexpensive to manufacture and install, by having one member of the seal serve the sealing function while a second member serves to prevent motion of the first seal member relative to a moving member that is to be sealed.

SUMMARY OF THE INVENTION

Accordant with the present invention, a two-piece seal that prevents wear of soft relatively moving parts, and is simple to manufacture, is easy to assemble, is capable of sealing in both directions, and has only one member that is affected by the pressure has been discovered. The seal comprises a first member having a pressure relief means, whereby said first member is substantially unaffected by pressurization of the seal. The second member of the seal has a second surface with a projections extending from the surface, where the second member is positioned adjacent said first member such that said projections on said second member engage said elastomeric first member and prevent relative movement therebetween.

The sealing system of the present invention is particularly useful in an automotive transmission application where the shaft of the transmission is made from aluminum, to prevent wear of the aluminum shaft due to rotation of the seal relative to the shaft.

DETAILED DESCRIPTION OF THE PREFERRED EMBODIMENTS

Figure 1:
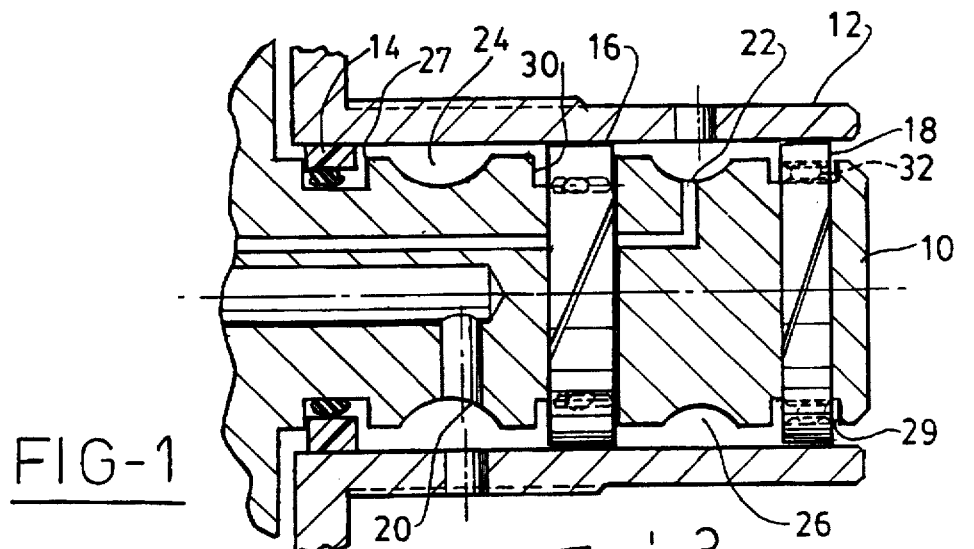
FIG. 1 is a cross sectional view of a longitudinal plane through a transmission shaft and housing, portraying the use of three seals incorporating one embodiment of the present invention between the transmission shaft and housing.

Referring first to FIG. 1, there is generally shown a cross section of a transmission seal system, which embodies the features of the present invention. The seal system includes a shaft 10 and housing 12 typical of the kind found in an automatic transmission hub. Additionally, three two-piece seals are generally shown 14, 16, 18 within grooves 27, 28, 29 on the shaft 10 for sealing between the shaft 10 and housing 12. The shaft 10 has fluid passages 20, 22 which enable pressurization of chambers 24, 26 during operation of the transmission.

In operation, when the fluid chamber 24 is pressurized, the first seal 14 is forced axially away from the pressurized chamber inside the groove 27 of the shaft 10, while the second seal 16 is forced axially in the opposite direction within the groove 28. Likewise, when the second chamber 26 is pressurized to an extent greater than the first chamber 24, the second seal 16 is forced axially leftward by the pressure to the opposite side of the second groove 28 and the third seal 18 is forced axially rightward in the opposite direction within the third groove 29. The seals thereby create a seal to prevent passage of fluid axially between the relatively rotating members 10, 12 outside the pressurized chambers 24, 26.

Figure 2:
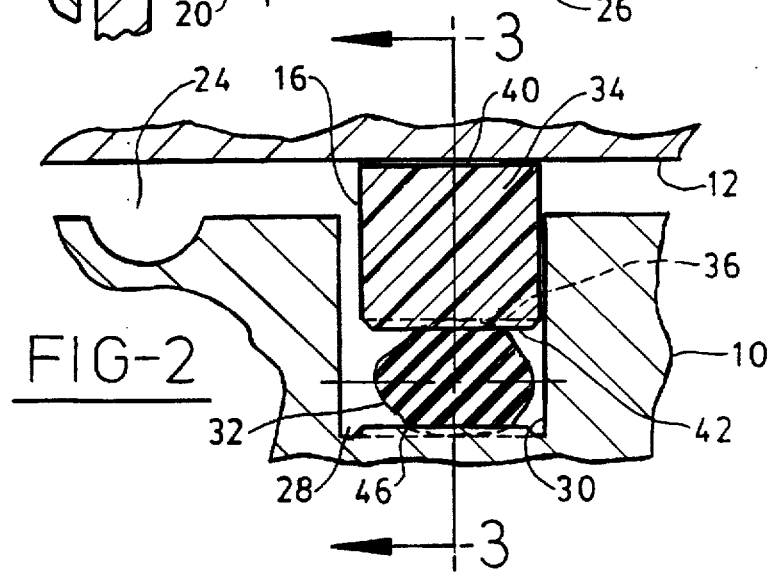
FIG. 2 is an enlarged view of a seal illustrated in FIG. 1.

Referring to FIG. 2, an enlarged view of the second seal 16 is shown within the groove 28 of the shaft 10. The seal 16 is comprised of an elastomeric member 32 and a hard member 34, which may be made from, for example, PTFE. As the chamber 24 adjacent the seal is pressurized, the seal 16 is forced toward the wall 30 of the groove 28 opposite the pressure, forcing the hard member 34 axially against the wall of the groove 30, which creates a seal between the hard member 34 and wall of the groove 30. The force at the base 36 of the hard member by the pressurized fluid forces the hard member 34 radially against the housing 12 at the opposite side 40 of the hard member to seal between the hard member 34 and the housing 12.

Figure 3:
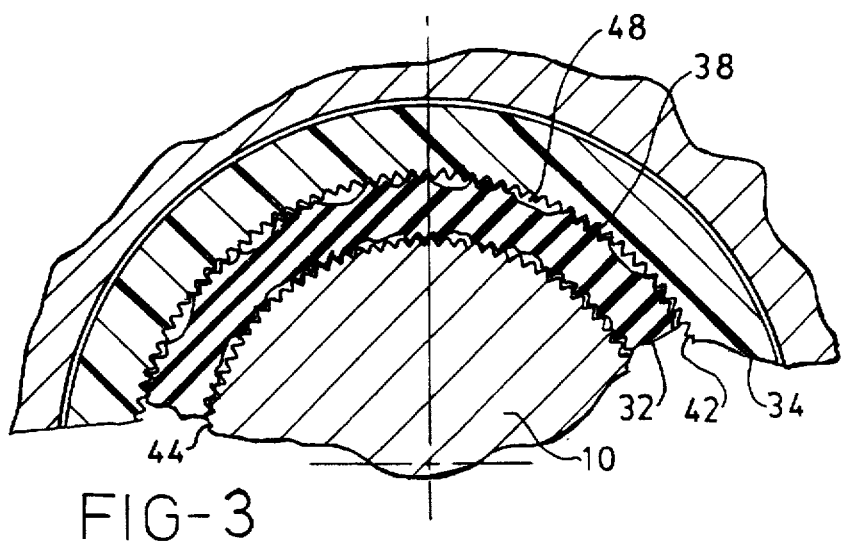
FIG. 3 is a cross sectional view of the seal illustrated in FIG. 2 taken along the line A—A.

As shown in FIG. 3, the elastomeric member 32 of the seal has a pressure relief means, comprised of protrusions 38 an depressions 48 on the surface of the elastomeric member. These depressions 48 enable the pressurized fluid to pass by the elastomeric seal, and therefore the fluid does non cause the elastomeric member to substantially flatten against the wall of the groove 30, as shown in FIG. 2. The protrusions 38 in the preferred embodiment may be nodular formations angularly spaced around the elastomeric member. But one skilled in the art would recognize the potential for variations, such as through holes, rectilinear formations, or any other such means to provide for fluid passage.

The hard member 34 has an antirotation means, comprising a substantially rough surface 42 adjacent the elastomeric member. In the preferred embodiment, this rough surface is created by molding projections on the inner surface of the hard seal parallel to a longitudinal axis of the seal. In the preferred embodiment, the projections are 0.5–1.5 mm tall. However, this rough surface may be obtained through several means, including machining, or any known means by which a generally rough surface may be formed.

The interference between the seal members causes the rough surface 42 of the hard seal member 34 to deform the surface of the elastomeric member 32 and thereby prevents relative rotation between the seal members 32, 34. One skilled in the art would recognize that prevention of relative rotation could be achieved by other known means, such as a secondary operation to bond the seal members.

Similarly, in the preferred embodiment, the shaft 10 has a substantially rough surface 44 at the base of the groove 28. This rough surface is comprised of projections which may be 0.5–1.5 mm tall. This rough surface may be obtained through several means, including machining, cold forming, or any known means by which a rough surface may be formed. The compression of the elastomeric member 32 created at the interface between the seal 32 and shaft 10 at the base of the groove 46 prevents relative rotation between the seal 32 and shaft 10. The equivalent of this rough surface can be obtained in several manners to prevent the relative rotation of the seal to the shaft, including an interference fit, secondary operations, or any other known means.

During installation of the seal 16, the elastomeric member is first expanded over the shaft 10 and fit into the groove 28. As shown in FIG. 3, the elastomeric member 32 of the preferred embodiment has protrusions 38 and depressions 48 which allow for easier expansion of the elastomeric member to enlarge the member 32 to fit over the shaft 10 than if the elastomeric member were a continuous cross section. The protrusions 38 also reduce the amount of material which is displaced when the elastomeric member is compressed by the hard member 34 at the interface 38 between the seal members and the interface 36 and between the elastomeric member 32 and the shaft 10, compared to a seal with a constant cross section.

After the elastomeric member 32 is fitted into the groove 28, the hard member 34 is expanded to fit over the shaft 10. In the preferred embodiment, the hard member 34 is a scarf-cut seal, which may be made from, for example, PTFE, and is easily expandable to install over the shaft as is well known in the art. The hard member 34 is then installed into the groove 27 over the elastomeric member 32. The hard member 34 is subsequently compressed, which causes further compression of the elastomeric member 32, so the seal 16 can fit inside the housing 12. Within the preferred embodiment, the seal assembly 16 has an interference to the housing 12 which may be 0.5–1.5 mm.

Because the hard seal members and grooves are substantially uninterrupted, the seal is able to seal if pressurized from either direction (ref. FIG. 1, seal 16 and chambers 24, 26.

In the preferred embodiment, the elastomeric member has a substantially round cross-section, which enables the elastomeric member to be installed easily without concern of twisting. A non-round cross section could create installation problems or impede the movement of the hard seal member if the elastomeric seal were twisted.

Although the preferred embodiment of the present invention has been disclosed, various changes and modifications may be made without departing from the scope of the invention as set forth in the appended claims.

We claim:

1. A sealing system, comprising:
 a first member having a groove, said groove having a first surface at the base of said groove;
 a second member positioned adjacent said first surface, said second member having a first end, a second end and a fluid passage therebetween, the fluid passage providing for continual fluid communication between the ends of the second member; and
 a third member having a third surface adjacent said second member with projections extending toward and engaging said second member to impede relative movement therebetween; and
 a fourth member positioned adjacent said third member, said third member sealingly engageable between said first and fourth members.

2. The sealing system of claim 1 wherein said first member is made of an aluminum alloy.

3. The sealing system of claim 1 wherein said second and third members are annular.

4. The sealing system of claim 1 wherein the first surface of the groove of the first member has second projections extending from the first surface which engage the second member to impede relative movement therebetween.

5. The sealing system of claim 1 wherein said second member is made from an elastomeric material and said third member is made from PTFE.

6. A sealing system for use in an automotive transmission, comprising:
 a first member supported for rotation having an annular groove with a first surface at the base of said groove and projections extending from said first surface of said groove, said groove further having an annular wall;

an annular second member positioned adjacent said first surface having a first end, a second end and a fluid passage therebetween, the fluid passage providing for continual fluid communication between the ends of the second member;

an annular third member having a third surface adjacent said second member, said third surface having longitudinal projections provided in said third surface, and said third member is positioned adjacent said second member such that said projections engage said second member to impede relative movement therebetween, said third member further having a fourth surface adjacent the annular wall of the groove sealingly engageable with the annular wall; and a fourth relatively rotating annular member positioned adjacent said third member sealingly engageable therewith.

7. The sealing system of claim 6 wherein the first member is made from an aluminum alloy, the second member is made of an elastomeric material, and the third member is made from PTFE.

8. A fluid sealing system, comprising:

a first member having an annular groove, with a first surface at the base of said groove and an annular wall extending radially therefrom;

a fourth member positioned adjacent said first member supported for relative rotation therebetween;

an annular third member positioned in said annular groove sealingly engaged with the annular wall therein, said annular third member further sealingly engaged with said fourth member;

an annular second member having a first end adjacent the annular wall and a second end axially disposed therefrom, said second member positioned between said first surface and said third member, said second member engaged with both said first member and said third member to impede rotation therebetween, said second member further having a fluid passage providing for continual fluid communication between the ends of the second member.

9. A sealing system according to claim 8, wherein the cross section of the second member is substantially round, and the diameter of said cross section varies along the length of said second member.

10. A sealing system according to claim 9, wherein the passage comprises a passage provided between said third and second members.

* * * * *